(12) United States Patent
Kataoka

(10) Patent No.: US 11,904,466 B2
(45) Date of Patent: Feb. 20, 2024

(54) BEARING, GEAR DEVICE, AND ROBOT

(71) Applicant: Seiko Epson Corporation, Toyko (JP)

(72) Inventor: Yuya Kataoka, Azumino (JP)

(73) Assignee: SEIKO EPSON CORPORATION (JP)

( * ) Notice: Subject to any disclaimer, the term of this patent is extended or adjusted under 35 U.S.C. 154(b) by 263 days.

(21) Appl. No.: 17/186,169

(22) Filed: Feb. 26, 2021

(65) Prior Publication Data

US 2021/0268642 A1 Sep. 2, 2021

(30) Foreign Application Priority Data

Feb. 28, 2020 (JP) ................................ 2020-033140

(51) Int. Cl.
| | |
|---|---|
| B25J 9/10 | (2006.01) |
| F16C 33/38 | (2006.01) |
| F16C 33/66 | (2006.01) |
| F16C 33/41 | (2006.01) |
| F16C 19/06 | (2006.01) |

(Continued)

(52) U.S. Cl.
CPC ............. B25J 9/1025 (2013.01); F16C 19/06 (2013.01); F16C 33/3887 (2013.01); F16C 33/418 (2013.01); F16C 33/60 (2013.01); F16C 33/66 (2013.01); F16C 33/6614 (2013.01); F16C 33/6629 (2013.01); F16C 33/6681 (2013.01);
(Continued)

(58) Field of Classification Search
CPC .................. F16C 19/06; F16C 33/3887; F16C 33/41–418; F16C 33/4676; F16C 33/60; F16C 33/66; F16C 33/6629; F16C 33/6881; F16C 2322/59; F16C 2361/61; F16C 33/6614; B25J 9/1025; F16H 49/001

See application file for complete search history.

(56) References Cited

U.S. PATENT DOCUMENTS

| | | | | |
|---|---|---|---|---|
| 2015/0240928 A1* | 8/2015 | Jones | ..................... | F16C 33/581 29/898.064 |
| 2016/0265593 A1* | 9/2016 | Shi | .......................... | F16C 19/26 |
| 2018/0283518 A1* | 10/2018 | Kataoka | ................. | F16C 19/163 |

FOREIGN PATENT DOCUMENTS

| | | | | |
|---|---|---|---|---|
| JP | H04-001716 A | | 1/1992 | |
| JP | H09229073 A | * | 9/1997 | ............ F16C 33/412 |

(Continued)

OTHER PUBLICATIONS

Machine Translation of JP-H09229073-A (Year: 1997).*
Machine Translation of JP-2006322594-A (Year: 2006).*
Machine Translation of JP-2013145024-A (Year: 2013).*

*Primary Examiner* — Alan B Waits
(74) *Attorney, Agent, or Firm* — Harness, Dickey & Pierce, P.L.C.

(57) ABSTRACT

A bearing includes an outer ring, an inner ring provided on the inner side in the radial direction of the outer ring, a rolling body provided between the outer ring and the inner ring, and a holder including a base formed in an annular shape around a center axis of the outer ring and the inner ring and a first wall section and a second wall section provided to project from the base, the holder holding the rolling body. The first wall section includes a first channel provided in the circumferential direction of the base. The second wall section includes a second channel provided in the circumferential direction of the base. The position of the first channel in the first wall section and the position of the second channel in the second wall section are different.

11 Claims, 10 Drawing Sheets

(51) Int. Cl.
*F16C 33/60* (2006.01)
*F16H 49/00* (2006.01)

(52) U.S. Cl.
CPC ........ *F16H 49/001* (2013.01); *F16C 2322/59* (2013.01); *F16C 2361/61* (2013.01)

(56) References Cited

FOREIGN PATENT DOCUMENTS

| | | | | | |
|---|---|---|---|---|---|
| JP | 2006322594 | A | * 11/2006 | ............ | F16C 33/412 |
| JP | 2006-342938 | A | 12/2006 | | |
| JP | 2013-145024 | A | 7/2013 | | |
| JP | 2013145024 | A | * 7/2013 | .......... | F16C 33/4676 |
| JP | 2019-183880 | A | 10/2019 | | |
| WO | 2019/198762 | A1 | 10/2019 | | |

\* cited by examiner

BEARING, GEAR DEVICE, AND ROBOT

The present application is based on, and claims priority from JP Application Serial Number 2020-033140, filed Feb. 28, 2020, the disclosure of which is hereby incorporated by reference herein in its entirety.

BACKGROUND

1. Technical Field

The present disclosure relates to a bearing, a gear device, and a robot.

2. Related Art

In a robot including a robot arm, for example, a joint section of the robot arm is driven by a motor. In general, rotation of the motor is decelerated via a gear device and transmitted to an arm.

An input shaft for inputting driving force and an output shaft for outputting the driving force after deceleration are coupled to the gear device. The shafts are supported by supporting sections or the like via, for example, bearings.

JP-A-2013-145024 (Patent Literature 1) discloses a cylindrical roller bearing including an outer ring having a track surface on an inner circumferential surface, an inner ring having a track surface on an outer circumferential surface, a plurality of cylindrical rollers disposed between the outer ring and the inner ring, and a holder that holds the cylindrical rollers. The holder holds the cylindrical rollers at a predetermined interval in a circumferential direction to enable the cylindrical rollers to roll.

FIG. 15 is a perspective view showing the holder according to related art.

A holder 9 shown in FIG. 15 includes a pair of annular bodies 91 opposed in the axial direction, a plurality of pillar bodies 92 coupling the annular bodies 91, a plurality of pockets 93 capable of housing the cylindrical rollers side by side in the circumferential direction, claws 94 projecting from the pillar bodies 92 in the radial direction inner side, and not-shown cylindrical rollers. In the pillar bodies 92, through-holes 96 piercing through both end faces in the circumferential direction and causing the pockets 93 adjacent to each other to communicate are formed. By providing such through-holes 96, it is possible to feed lubrication oil via the through-holes 96. As a result, irrespective of a rotating direction of the bearing, it is possible to reduce a difference in a lubrication state between the pockets 93 and improve lubricity of the holder 9 as a whole.

In the holder 9 described in Patent Literature 1, the positions in the axial direction of the through-holes 96 are the same among the pillar bodies 92. Specifically, four through-holes 96 are formed in each of the pillar bodies 92. As shown in FIG. 15, forming positions of the through-holes 96 in the axial direction are the same among the pillar bodies 92. Accordingly, when the lubrication oil deviates to flow through only a part of the through-hole 96 among the four through-holes 96, a phenomenon in which lubrication oil flows only through a part of the through-holes 96 could occur in all of the pillar bodies 92. Then, the lubricity can be improved only in a part of the surfaces of the cylindrical rollers.

SUMMARY

A bearing according to an application example of the present disclosure includes: an outer ring; an inner ring provided on an inner side in a radial direction of the outer ring; a rolling body provided between the outer ring and the inner ring; and a holder including a base formed in an annular shape around a center axis of the outer ring and the inner ring and a first wall section and a second wall section provided to project from the base, the holder holding the rolling body. The first wall section includes a first channel provided in a circumferential direction of the base. The second wall section includes a second channel provided in the circumferential direction of the base. A position of the first channel in the first wall section and a position of the second channel in the second wall section are different.

A gear device according to an application example of the present disclosure includes: an internal gear; an external gear having flexibility configured to partially mesh with the internal gear and relatively rotate around a rotation axis with respect to the internal gear; and a wave generator provided on an inner side of the external gear, including the bearing according to the application example, and configured to move a meshing position of the internal gear and the external gear in a circumferential direction around the rotation axis.

A robot according to an application example of the present disclosure includes: a first member; a second member configured to turn with respect to the first member; the gear device according to the application example configured to transmit driving force for relatively turning the second member with respect to the first member; and a driving source configured to output the driving force toward the gear device.

DESCRIPTION OF EXEMPLARY EMBODIMENTS

A bearing, a gear device, and a robot according to the present disclosure are explained in detail below based on preferred embodiments shown in the accompanying drawings.

1. Robot

First, the robot is briefly explained.

Figure 1:
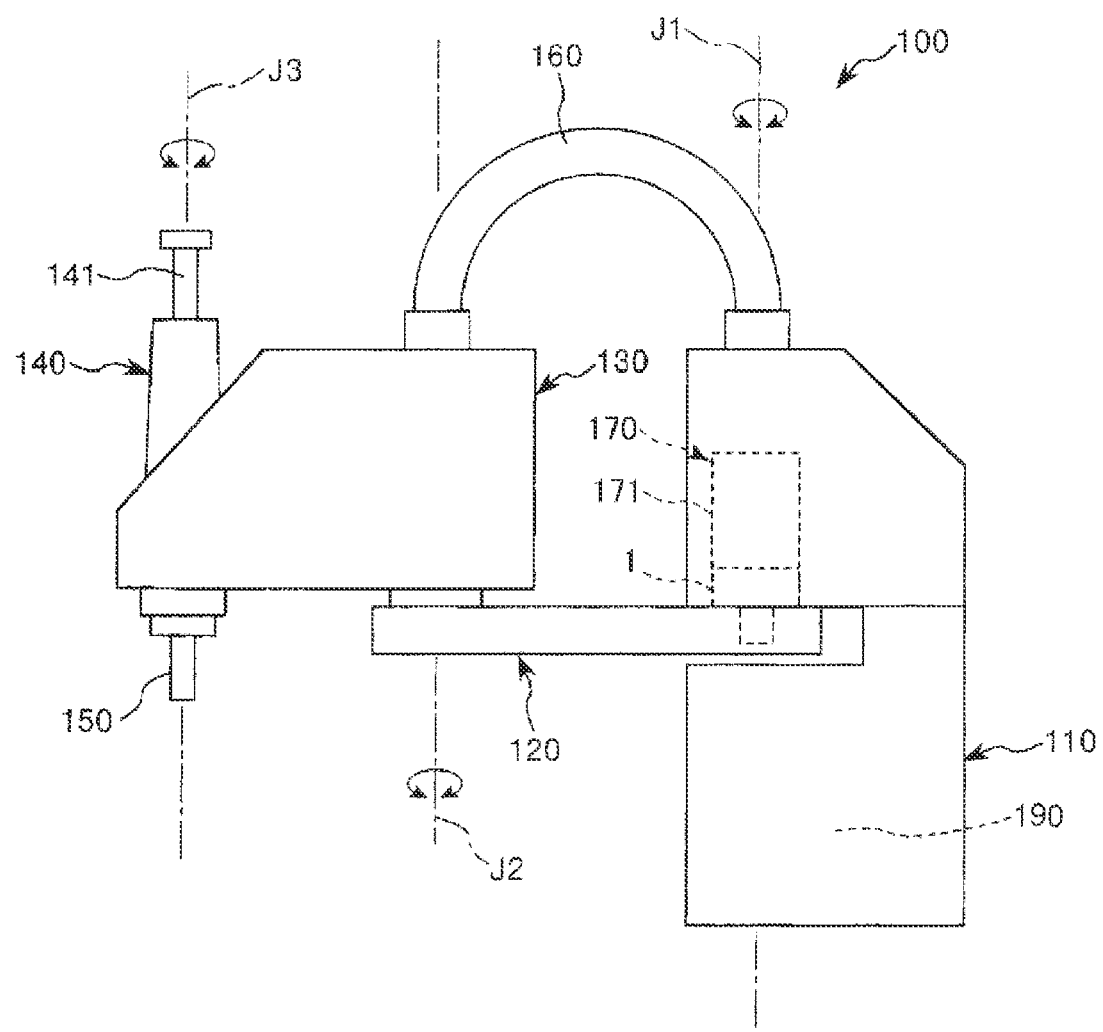
FIG. 1 is a side view showing a schematic configuration of a robot according to an embodiment.

FIG. 1 is a side view showing a schematic configuration of a robot according to an embodiment. In the following explanation, for convenience of explanation, the upper side in FIG. 1 is referred to as "upper" and the lower side in FIG. 1 is referred to as "lower". A base side in FIG. 1 is referred to as "proximal end side" and the opposite side of the base side, that is, an end effector side is referred to as "distal end side". The up-down direction in FIG. 1 is represented as "vertical direction" and the left-right direction in FIG. 1 is represented as "horizontal direction". A "direction" in this specification includes both of a direction on one side along an axis and the opposite direction of the direction.

A robot 100 shown in FIG. 1 is, for example, a robot used for work such as supply, removal, conveyance, and assembly of a precision instrument and components configuring the precision instrument. The robot 100 includes, as shown in FIG. 1, a base 110, a first arm 120, a second arm 130, a work head 140, an end effector 150, and a pipe 160. The sections of the robot 100 are briefly explained below in order. "Turning" includes moving in both directions including one direction and the opposite direction of the one direction with respect to a certain center point and rotating with respect to the certain center point.

The base 110 is fixed to, for example, a not-shown floor surface by bolts or the like. A control device 190 that integrally controls the robot 100 is set on the inside of the base 110. The first arm 120 is coupled to the base 110 to be capable of turning around a first axis J1, which is along the vertical direction, with respect to the base 110. That is, the first arm 120 relatively turns with respect to the base 110.

In the base 110, a first driving section 170 is set. The first driving section 170 includes a motor 171 (a driving source), which is a first motor such as a servomotor that generates driving force for turning the first arm 120, and a gear device 1, which is a first speed reducer that decelerates rotation by the motor 171. An input shaft of the gear device 1 is coupled to a rotating shaft of the motor 171. An output shaft of the gear device 1 is coupled to the first arm 120. Therefore, when the motor 171 is driven and the driving force of the motor 171 is transmitted to the first arm 120 via the gear device 1, the first arm 120 turns in a horizontal plane around the first axis J1.

The second arm 130 capable of turning around a second axis J2 with respect to the first arm 120 is coupled to the distal end portion of the first arm 120. In the second arm 130, although not shown in FIG. 1, a second driving section including a second motor that generates driving force for turning the second arm 130 and a second speed reducer that decelerates rotation of the second motor is set. The driving force of the second motor is transmitted to the second arm 130 via the second speed reducer, whereby the second arm 130 turns in a horizontal plane around the second axis J2 with respect to the first arm 120.

The work head 140 is disposed at the distal end portion of the second arm 130. The work head 140 includes a spline shaft 141 inserted through a not-shown spline nut and a not-shown ball screw nut coaxially disposed at the distal end portion of the second arm 130. The spline shaft 141 is capable of rotating around a third axis J3 shown in FIG. 1 with respect to the second arm 130 and is capable of moving in the up-down direction.

In the second arm 130, although not shown in FIG. 1, a rotary motor and a lifting and lowering motor are disposed. Driving force of the rotary motor is transmitted to the spline nut by a not-shown driving force transmitting mechanism.

When the spline nut regularly and reversely rotates, the spline shaft 141 regularly and reversely rotates around the third axis J3, which is along the vertical direction.

On the other hand, driving force of the lifting and lowering motor is transmitted to the ball screw nut by a not-shown driving force transmitting mechanism. When the ball screw nut regularly and reversely rotates, the spline shaft 141 moves up and down.

The end effector 150 is coupled to the distal end portion of the spline shaft 141. The end effector 150 is not particularly limited. Examples of the end effector 150 include an end effector that grips a conveyed object and an end effector that machines a workpiece.

A plurality of wires coupled to electronic components, for example, the second motor, the rotary motor, and the lifting and lowering motor disposed in the second arm 130 are drawn around to the inside of the base 110 through the pipe 160 coupling the second arm 130 and the base 110. Further, such a plurality of wires are collected in the base 110 to thereby be drawn around to the control device 190 set in the base 110 together with wires coupled to the motor 171 and a not-shown encoder.

As explained above, the robot 100 includes the base 110, which is a first member, the first arm 120, which is a second member, provided to be capable of turning with respect to the base 110, the gear device 1 that transmits driving force from one side to the other side of the base 110 and the first arm 120, and the motor 171, which is the driving source that outputs driving force toward the gear device 1.

The first arm 120 and the second arm 130 may be collectively grasped as the "second member". The "second member" may further include the work head 140 and the end effector 150 in addition to the first arm 120 and the second arm 130.

In this embodiment, the first speed reducer is configured by the gear device 1. However, the second speed reducer may be configured by the gear device 1 or both of the first speed reducer and the second speed reducer may be configured by the gear device 1. When the second speed reducer is configured by the gear device 1, the first arm 120 should be grasped as the "first member" and the second arm 130 should be grasped as the "second member".

In this embodiment, the motor 171 and the gear device 1 are provided in the base 110. However, the motor 171 and the gear device 1 may be provided in the first arm 120. In this case, the output shaft of the gear device 1 should be coupled to the base 110.

2. Gear Device

2.1 First Embodiment

A gear device according to a first embodiment is explained.

Figure 2:
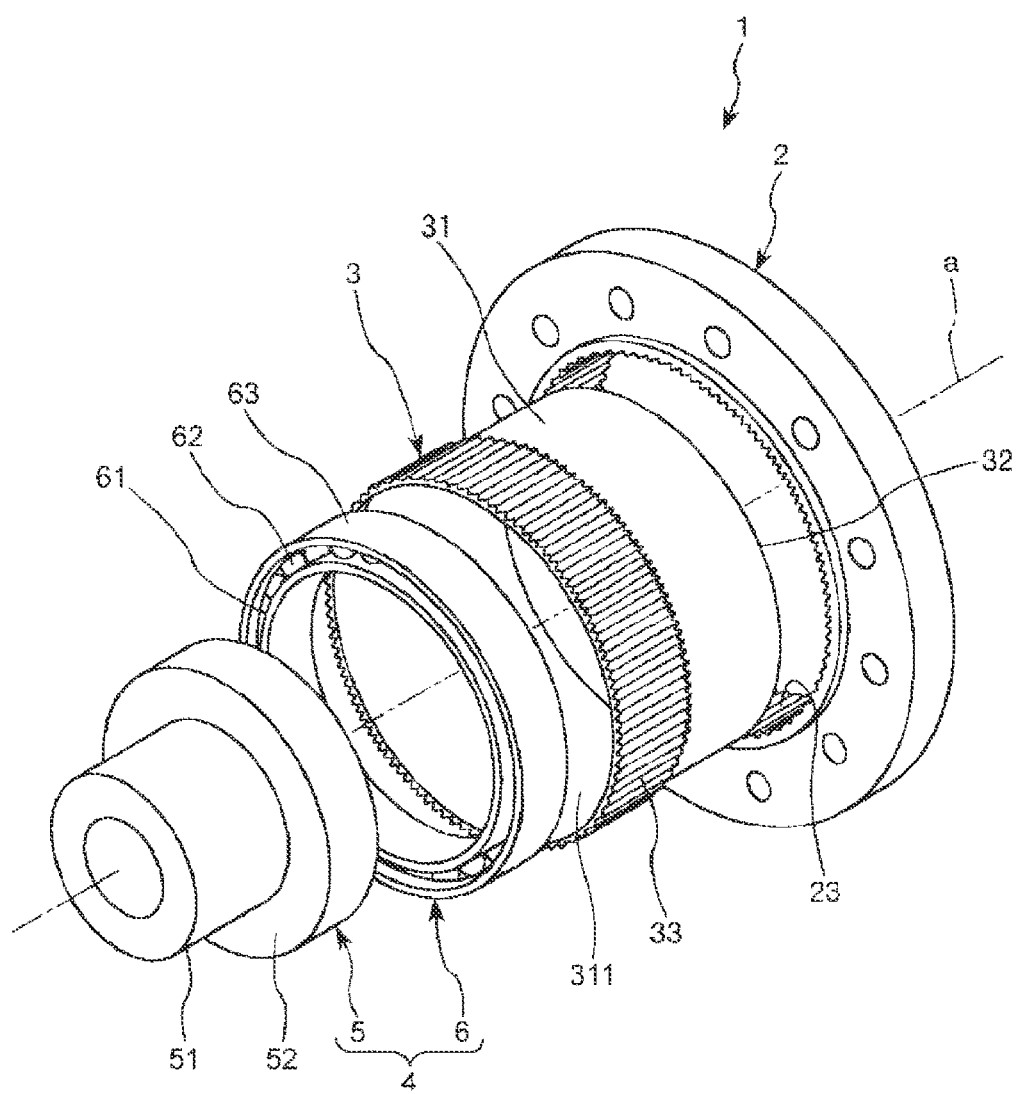
FIG. 2 is an exploded perspective view showing a gear device according to a first embodiment.
Figure 3:
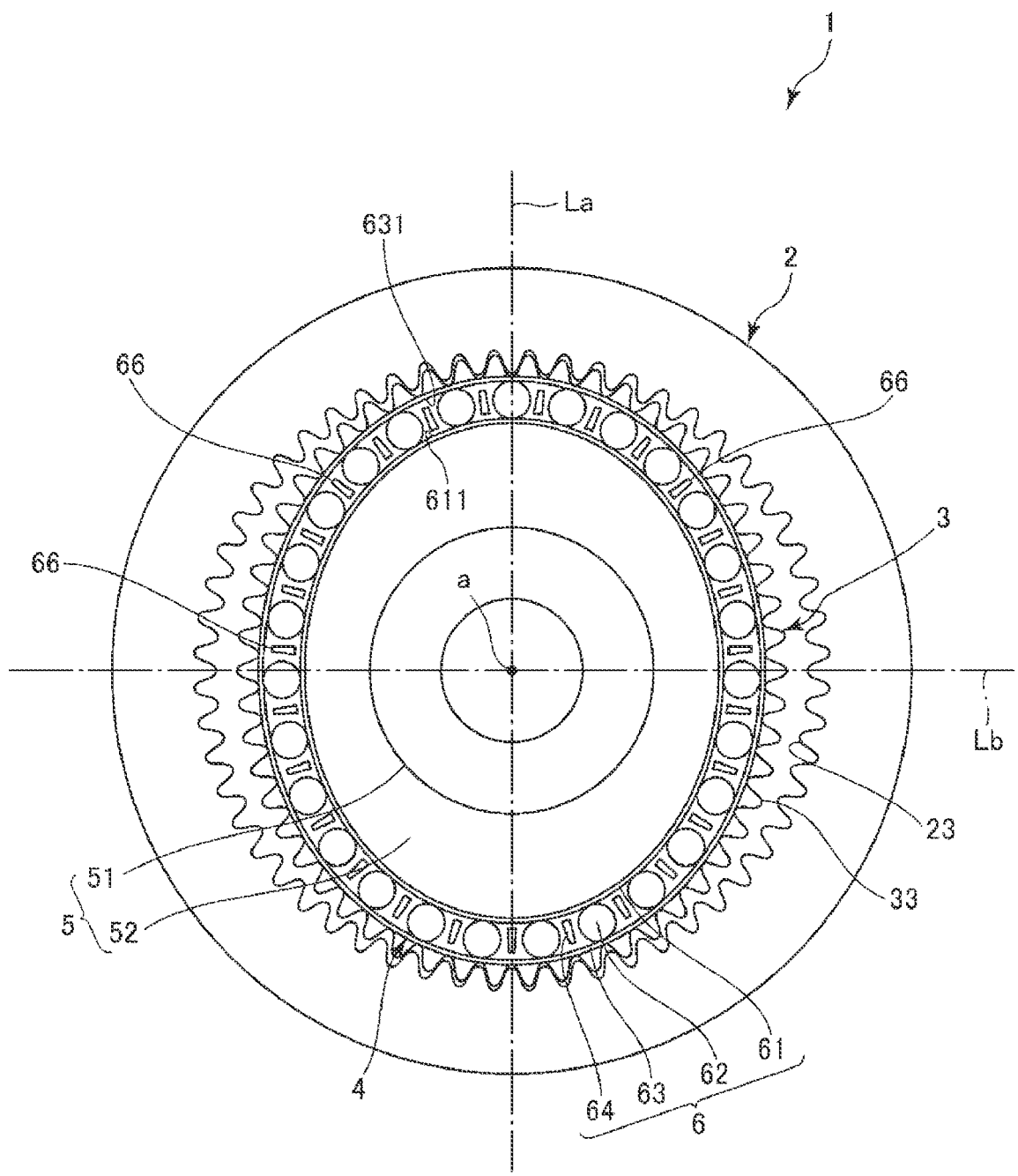
FIG. 3 is a front view of the gear device shown in FIG. 2.
Figure 4:
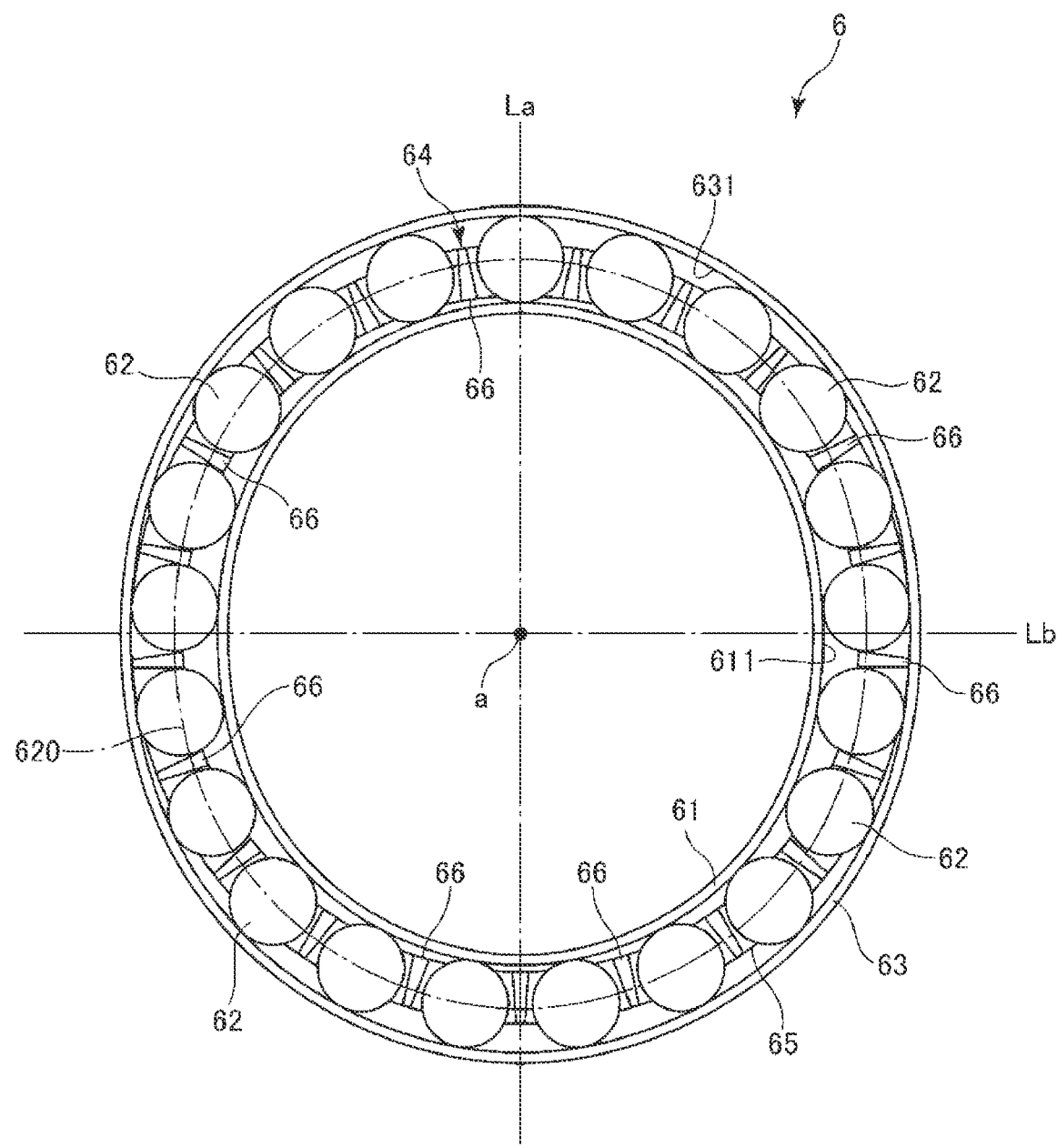
FIG. 4 is a view showing only a bearing in the gear device shown in FIG. 3.
Figure 5:
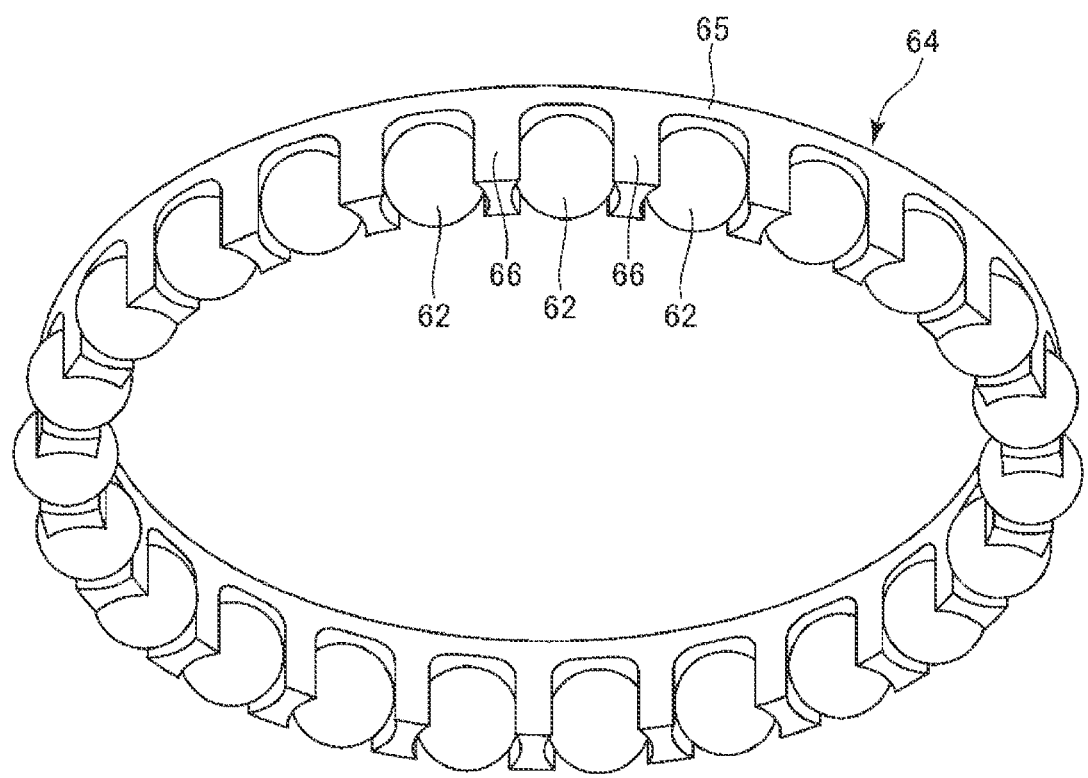
FIG. 5 is a perspective view showing only a holder and rolling bodies in the bearing shown in FIG. 4.
Figure 6:
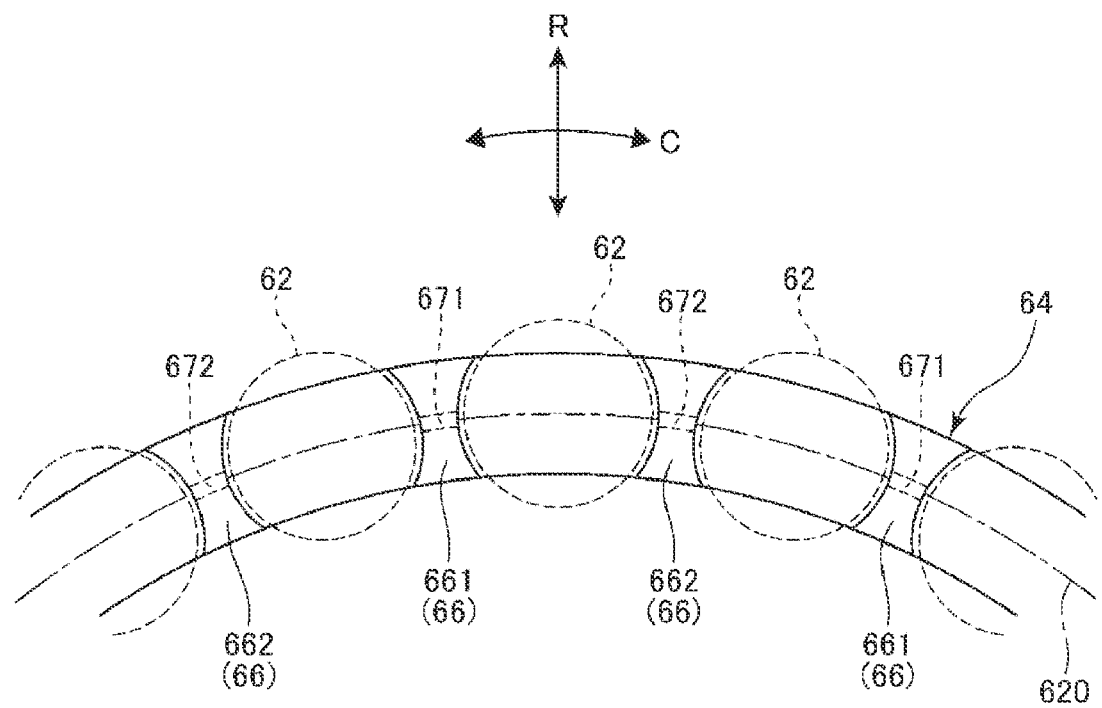
FIG. 6 is a plan view of the holder shown in FIG. 5.
Figure 7:
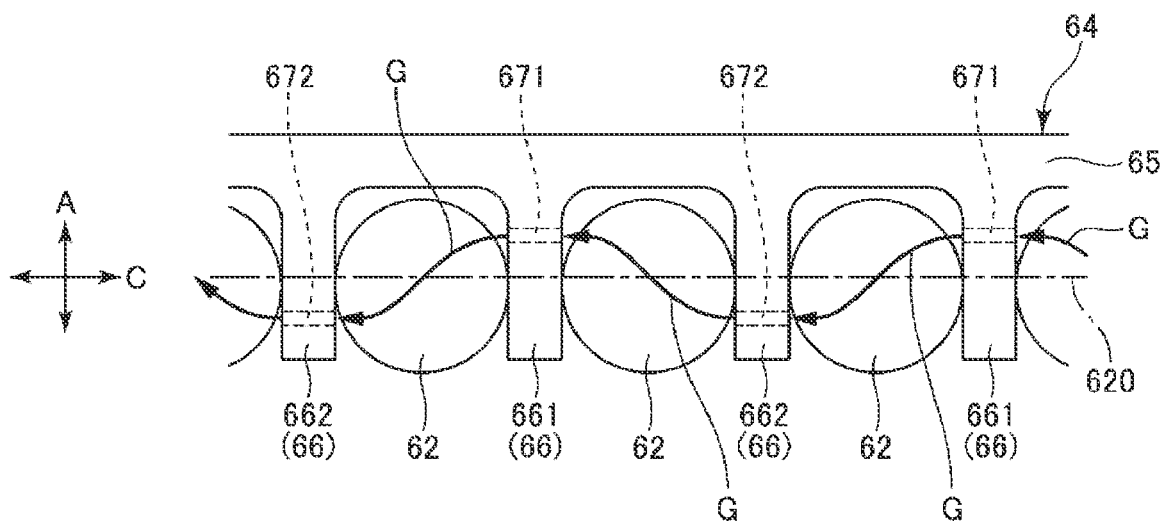
FIG. 7 is a view of the holder and the rolling bodies shown in FIG. 5 when viewed from an outer ring side.

FIG. 2 is an exploded perspective view showing the gear device according to the first embodiment. FIG. 3 is a front view of the gear device shown in FIG. 2. FIG. 4 is a view showing only a bearing in the gear device shown in FIG. 3. FIG. 5 is a perspective view showing only a holder and rolling bodies in the bearing shown in FIG. 4. FIG. 6 is a plan view of the holder shown in FIG. 5. FIG. 7 is a view of the holder and the rolling bodies shown in FIG. 5 when viewed from an outer ring side. In the figures, for convenience of explanation, dimensions of sections are exaggerated and shown as appropriate according to necessity and dimension ratios among the sections do not always coincide with actual dimension ratios. In the following explanation, a direction parallel to an axis "a" is represented as "axial direction A", a circumferential direction of a circle centering on the axis "a" is represented as "circumferential direction C", and a direction from the axis "a" toward the circle is represented as "radial direction R".

The gear device 1 shown in FIG. 2 is a wave gear device and is used as, for example, a speed reducer. The gear device 1 includes an internal gear 2, an external gear 3 provided on the inner side of the internal gear 2, and a wave generator 4 provided on the inner side of the external gear 3 and including a bearing 6. Lubricant G such as grease is properly disposed in sections of the gear device 1, specifically, a meshing section of the internal gear 2 and the external gear 3, a fitting section of the external gear 3 and the wave generator 4, and the like.

One of the internal gear 2, the external gear 3, and the wave generator 4 is coupled to the base 110 of the robot 100 explained above and another one is coupled to the first arm 120 of the robot 100. In this embodiment, the internal gear 2 is fixed to the base 110, the external gear 3 is coupled to the first arm 120, and the wave generator 4 is coupled to the rotating shaft of the motor 171.

Accordingly, when the rotating shaft of the motor 171 rotates, the wave generator 4 rotates at the same rotating speed as rotating speed of the rotating shaft of the motor 171. Since the internal gear 2 and the external gear 3 have different numbers of teeth, the internal gear 2 and the external gear 3 relatively rotate around the axis "a", which is a rotation axis, because of the difference between the numbers of teeth while a meshing position of the internal gear 2 and the external gear 3 moving in the circumferential direction. In this embodiment, since the number of teeth of the internal gear 2 is larger than the number of teeth of the external gear 3, it is possible to rotate the external gear 3 at rotating speed lower than the rotating speed of the rotating shaft of the motor 171. That is, it is possible to realize a speed reducer in which the wave generator 4 is on an input shaft side and the external gear 3 is on an output shaft side.

A coupling form of the internal gear 2, the external gear 3, and the wave generator 4 is not limited to the form explained above. For example, even when the external gear 3 is fixed to the base 110 and the internal gear 2 is coupled to the first arm 120, the gear device 1 can also be used as the speed reducer. Even when the external gear 3 is coupled to the rotating shaft of the motor 171, the gear device 1 can also be used as the speed reducer. In this case, the wave generator 4 should be fixed to the base 110 and the internal gear 2 should be coupled to the first arm 120. When the gear device 1 is used as a speed increaser, that is, when the external gear 3 is rotated at rotating speed higher than the rotating speed of the rotating shaft of the motor 171, the relation between the input side and the output side explained above should be reversed.

As shown in FIG. 2, the internal gear 2 is a ring-like rigid gear including internal teeth 23 and configured by a rigid body that does not substantially bend in the radial direction. A method of fixing the internal gear 2 and the base 110 is not particularly limited. Examples of the fixing method include screwing.

The external gear 3 is inserted through the inner side of the internal gear 2. The external gear 3 is a flexible gear including external teeth 33, which mesh with the internal teeth 23 of the internal gear 2, and deflectively deformable in the radial direction. The number of teeth of the external gear 3 is smaller than the number of teeth of the internal gear 2. Since the numbers of teeth of the external gear 3 and the internal gear 2 are different from each other in this way, as explained above, the speed reducer can be realized by the gear device 1.

In this embodiment, the external gear 3 is formed in a cup shape. The external teeth 33 are formed on the outer circumferential surface of the external gear 3. The external gear 3 includes a bottomed cylindrical body section 31 including an opening 311 at one end portion and a bottom section 32 projecting from the other end portion of the body section 31. The body section 31 includes the external teeth 33 that mesh with the internal gear 2 centering on the axis "a". A shaft body on the output side, for example, the first arm 120 is attached to the bottom section 32 by crewing or the like.

As shown in FIG. 3, the wave generator 4 is disposed on the inner side of the external gear 3 and capable of rotating around the axis "a". The wave generator 4 deforms a cross section of the body section 31 of the external gear 3, which is circular in a natural state, into an elliptical shape or an oval shape having a major axis La and a minor axis Lb to partially mesh a part of the external teeth 33, specifically, both sides of the major axis La with the internal teeth 23 of the internal gear 2.

As shown in FIG. 3, the wave generator 4 includes a cam 5 and a bearing 6 attached to the outer circumference of the cam 5 and sandwiched between the cam 5 and the external gear 3. The cam 5 includes a shaft section 51 that rotates around the axis "a" and a cam section 52 projecting to the outer side from one end portion of the shaft section 51. When viewed from a direction along the axis "a", the cam section 52 is formed in a longitudinal shape, in particular, in this embodiment, an elliptical shape or an oval shape having the up-down direction in FIG. 3 as the major axis La. However, the shape of the cam section 52 is not particularly limited if the shape is the longitudinal shape.

As shown in FIG. 3, the bearing 6 is a ball bearing and includes a flexible inner ring 61 and a flexible outer ring 63, a plurality of balls 62 (rolling bodies) disposed between the inner ring 61 and the outer ring 63, and a holder 64 that holds the plurality of balls 62 to keep an interval in the circumferential direction C constant. In a natural state, the bearing 6 is formed in a circular shape when viewed from the direction along the axis "a". The cam section 52 is fit in the inner side of the bearing 6, whereby the bearing 6 is deformed into an elliptical shape or an oval shape along the outer circumferential surface of the cam section 52.

The inner ring 61 is fit in the outer circumferential surface of the cam section 52 of the cam 5 and elastically deformed into an elliptical shape or an oval shape along the outer circumferential surface of the cam section 52. According to the elastic deformation of the inner ring 61, the outer ring 63 is also elastically deformed into an elliptical shape or an oval shape. The outer circumferential surface of the inner ring 61 and the inner circumferential surface of the outer ring 63 are respectively formed as track surfaces 611 and 631 for rolling the plurality of balls 62 while guiding the plurality of balls 62 along the circumferential direction.

FIG. 3 is a view for briefly explaining an overall configuration of the bearing 6. Therefore, for convenience of explanation, the configuration of the bearing 6, in particular, the configuration of the holder 64 is simplified and shown. Details of the holder 64 are explained below with reference to FIGS. 4 to 7.

In such a wave generator 4, as the cam 5 rotates around the axis "a", the direction of the cam section 52 changes. According to the change of the direction of the cam section 52, the outer ring 63 is also deformed to move the meshing position of the internal gear 2 and the external gear 3 in the circumferential direction. Since the inner ring 61 is fixedly set with respect to the outer circumferential surface of the cam section 52, a deformed state of the inner ring 61 does not change. The meshing position of the internal gear 2 and the external gear 3 moves in the circumferential direction, whereby the internal gear 2 and the external gear 3 relatively rotate around the axis "a" because of the difference between the numbers of teeth of the internal gear 2 and the external gear 3. That is, the first arm 120, to which the external gear 3 is fixed, turns around the axis "a" with respect to the base 110, to which the internal gear 2 is fixed.

The plurality of balls 62 are disposed between the inner ring 61 and the outer ring 63. The plurality of balls 62 are held by the holder 64 to be arranged side by side substantially at equal intervals in the circumferential direction of the bearing 6. Consequently, fluctuation in an interval between an adjacent pair of balls 62 is prevented. Deterioration in characteristics of the bearing 6 can be suppressed. The number of balls 62 may be either an odd number or an even number. However, from a viewpoint that timing when the balls 62 are located on both the sides of the major axis La does not occur, the number of balls 62 is preferably an odd number. Consequently, deterioration in a rotation characteristic that occurs when the balls 62 are located on both the side of the major axis La is suppressed. It is possible to perform smooth rotation. Rolling bodies other than balls, for example, rollers may be used instead of the balls 62.

The holder 64 includes, as shown in FIGS. 4 and 5, a base 65 formed in an annular shape around the axis "a" (the center axis) and a plurality of wall sections 66 projecting from the base 65 and disposed between the inner ring 61 and the outer ring 63 shown in FIG. 3. An external shape of the base 65 is a circular shape in a natural state. Even if the bearing 6 is fit in the cam 5, since the base hardly receives force from the cam 5, the base 65 maintains a substantially circular shape.

The plurality of wall sections 66 are disposed at equal intervals along the circumferential direction of the base 65. The plurality of wall sections 66 are disposed such that one ball 62 is located between an adjacent pair of wall sections 66. That is, in the bearing 6, the balls 62 and the wall sections 66 are alternately disposed side by side along the circumferential direction C. By disposing one ball 62 between the pair of wall sections 66 in this way, it is possible to dispose the plurality of balls 62 at equal intervals. In a natural state before the inner ring 61 and the outer ring 63 are deformed into an elliptical shape or an oval shape, the balls 62 are loosely held between a pair of wall sections 66 located on both sides in the circumferential direction C of the inner ring 61 and the outer ring 63. Slight movement of the balls 62 is allowed. Consequently, it is possible to reduce a frictional force applied to the balls 62 while holding the balls 62. As a result, it is possible to easily idly rotate the balls 62.

When viewed from a position along the axis "a", as shown in FIG. 6, the wall section 66 includes two side surfaces formed as concave curved surfaces opposed to the outer surfaces of the balls 62. By causing such side surfaces to be opposed to the balls 62, it is possible to hold the balls 62 in appropriate positions without hindering the rotation of the balls 62. The shape of the wall section 66 is not limited to this.

In FIGS. 6 and 7, among the plurality of wall sections 66, two wall sections 66 adjacent to each other are, in particular, represented as a first wall section 661 and a second wall section 662. In the following explanation, the wall sections 66 are explained focusing on the first wall section 661 and the second wall section 662.

The first wall section 661 includes, as shown in FIG. 7, a first channel 671 piercing through the first wall section 661 along the circumferential direction C. Since the first channel 671 pierces through the first wall section 661, the first channel 671 enables movement of the lubricant G via the first channel 671 between housing spaces of two balls 62 partitioned by the first wall section 661.

The first channel 671 is provided further on the base 65 side than a center circle 620 that connects the centers of the balls 62. The first channel 671 should extend in a direction having a component of the circumferential direction of the base 65, that is, the circumferential direction C and may extend in, for example, a direction tilting with respect to the circumferential direction C.

The second wall section 662 includes, as shown in FIG. 7, a second channel 672 piercing through the second wall section 662 along the circumferential direction C. Since the second channel 672 pierces through the second wall section 662, the second channel 672 enables movement of the lubricant G via the second channel 672 between housing spaces of two balls 62 partitioned by the second wall section 662.

The second channel 672 is provided further on the opposite side of the base 65 than the center circle 620. The second channel 672 should extend in a direction having a component in the circumferential direction of the base 65, that is, the circumferential direction C and may extend in, for example, a direction tilting with respect to the circumferential direction C.

As explained above, the bearing 6 includes the outer ring 63, the inner ring 61 provided on the inner side in the radial direction of the outer ring 63, the balls 62 (the rolling bodies) provided between the outer ring 63 and the inner ring 61, and the holder 64 that includes the base 65 and the first wall section 661 and the second wall section 662 and holds the balls 62. The base 65 is formed in the annular shape around the center axis of the outer ring 63 and the inner ring 61. The first wall section 661 and the second wall section 662 are respectively provided to project from the base 65. The first wall section 661 includes the first channel 671 provided in the circumferential direction of the base 65. The second wall section 662 includes the second channel 672 provided in the circumferential direction of the base 65. In the holder 64 shown in FIG. 7, the position of the first channel 671 in the first wall section 661 and the position of the second channel 672 in the second wall section 662 are different.

With such a configuration, it is possible to form a satisfactory flow of the lubricant G while preventing deviation in the housing space in which the ball 62 is housed. That is, since the positions of the first channel 671 and the second channel 672 opened in the housing space are different, it is possible to prevent a flow of the lubricant G from deviating. Consequently, it is possible to supply the lubricant G to wider ranges between the ball 62 and the inner ring 61 and between the ball 62 and the outer ring 63. As a result, it is possible to improve lubricity in a wider range of the ball 62 and achieve extension of the life of the bearing 6.

In particular, in this embodiment, the first channel 671 and the second channel 672 are respectively opened in one housing space. Opening sections of the first channel 671 and the second channel 672 are located on both the sides across the center circle 620. That is, the position of the first channel 671 and the position of the second channel 672 are different from each other in the axial direction of the base 65, that is, the axial direction A. Accordingly, a typical flow of the lubricant G when viewed from the radial direction R passes near the center of the ball 62 at a high probability as shown in FIG. 7. Consequently, it is possible to cause the flow of the lubricant G to meander to be repeatedly displaced along the axial direction A. As a result, it is possible to particularly improve lubricity of the balls 62.

The position of the first channel 671 and the position of the second channel 672 are not limited to the positions described above. Both of the position of the first channel 671 and the position of the second channel 672 may be present further on the base 65 side or the opposite side of the base 65 side than the center circle 620.

In FIG. 7, the first wall section 661 including the first channel 671 and the second wall section 662 including the second channel 672 are adjacent to each other in the circumferential direction of the base 65, that is, the circumferential direction C. Consequently, compared with when the first wall section 661 and the second wall section 662 are not adjacent to each other, it is possible to expand a flow of the lubricant G around one ball 62 to a wider range. Accordingly, it is possible to more surely suppress deviation of the lubricant G.

The first wall section 661 and the second wall section 662 may not be adjacent to each other. That is, a part of the effects described above can be obtained even when the positions of channels are not different in the wall sections 66 adjacent to each other but the positions of the channels are different in the wall sections 66 more separated from each other, for example, the wall sections 66 separated from each other by several wall sections 66 in the circumferential direction C.

As shown in FIGS. 6 and 7, the ball 62 (the rolling body) is not in contact with a hole or a recess explained below, which is the first channel 671, and a hole or a recess explained below, which is the second channel 672. Specifically, portions of the first wall section 661 and the second wall section 662 crossing the center circle 620 easily come into contact with the ball 62. However, for example, both of an opening of the hole of the first channel 671 and an opening of the hole of the second channel 672 deviate from the center circle 620. Accordingly, a probability that the ball 62 does not come into contact with these openings is high. Consequently, a probability that the ball 62 closes the first channel 671 and the second channel 672 is low. The ball 62 less easily hinder the flow of the lubricant G in the first channel 671 and the second channel 672. As a result, it is easy to supply the lubricant G to a wider range. It is possible to further improve the lubricity of the balls 62.

The first channel 671 shown in FIGS. 6 and 7 is a hole provided in the first wall section 661. Similarly, the second channel 672 shown in FIGS. 6 and 7 is a hole provided in the second wall section 662. Both ends of these holes are opened and, on the other hand, side surfaces of the holes are not opened and are closed. Accordingly, it is possible to minimize deterioration in mechanical strength of the first wall section 661 due to the provision of the first channel 671. Similarly, it is possible to minimize deterioration in mechanical strength of the second wall section 662 due to the provision of the second channel 672. As a result, it is possible to obtain the holder 64 that is less easily broken even if the first channel 671 and the second channel 672 are provided in the holder 64.

The first channel 671 and the second channel 672 respectively may be recesses rather than the holes.

Figure 8:
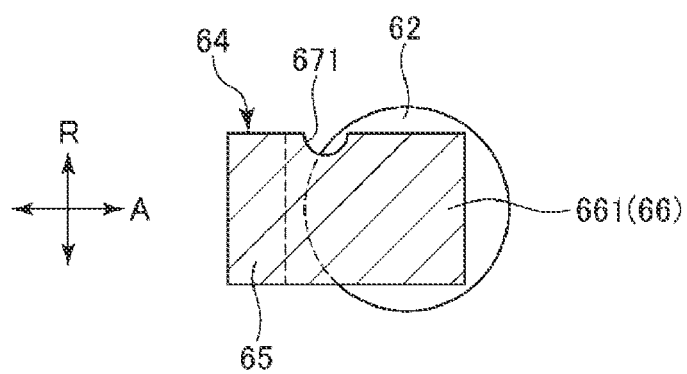
FIG. 8 is a cross sectional view showing a modification in which a first channel shown in FIGS. 6 and 7 is a recess.

FIG. 8 is a cross sectional view showing a modification in which the first channel 671 shown in FIGS. 6 and 7 is a recess. Both the ends of the first channel 671 shown in FIG. 8 are opened and a part of the side surface of the first channel 671 is also opened in the radial direction R. Such a first channel 671 has an advantage that the first channel 671 can be easily formed by machining or the like.

Figure 9:
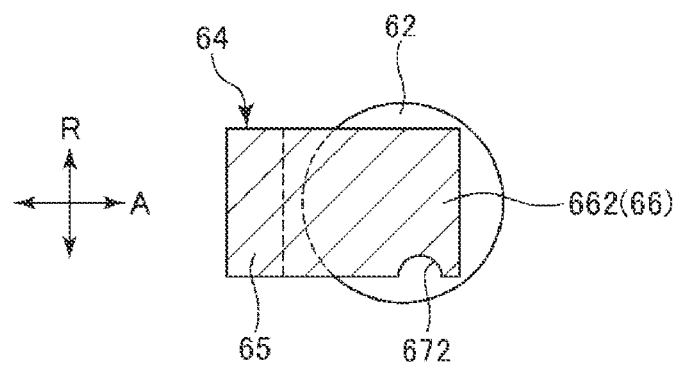
FIG. 9 is a cross sectional view showing a modification in which a second channel shown in FIGS. 6 and 7 is a recess.

FIG. 9 is a cross sectional view showing a modification in which the second channel 672 shown in FIGS. 6 and 7 is a recess. Both the ends of the second channel 672 shown in FIG. 9 are opened and a part of the side surface of the second channel 672 is also opened in the radial direction R. Such a second channel 672 has an advantage that the second channel 672 can be easily formed by machining or the like.

In FIGS. 8 and 9, the position of the first channel 671 and the position of the second channel 672 are not only different from each other in the axial direction of the base 65, that is, the axial direction A but also different from each other in the radial direction of the base 65, that is, the radial direction R.

With such a configuration, it is possible to form a flow of the lubricant G spreading to a wide range in the axial direction A and form a flow of the lubricant G spreading to a wide range in the radial direction R as well.

In FIGS. 8 and 9, the position of the first channel 671 and the position of the second channel 672 are different from each other in both of the axial direction A and the radial direction R. However, the positions may be the same in the axial direction A and different from each other only in the radial direction R.

The constituent material of the holder 64 is not particularly limited. Examples of the constituent material include a resin material and a metal material. Examples of the resin material include polyacetal, polyamide, and fluorocarbon resin.

The gear device 1 according to this embodiment includes the internal gear 2, the external gear 3, and the wave generator 4 including the bearing 6. The external gear 3 is a gear having flexibility that partially meshes with the internal gear 2 and relatively rotates around the axis "a" (the rotation axis) with respect to the internal gear 2. The wave generator 4 is provided on the inner side of the external gear 3 and moves the meshing position of the internal gear 2 and the external gear 3 in the circumferential direction around the rotation axis.

With such a gear device 1, since satisfactory lubricity is obtained in the bearing 6, extension of life is achieved.

The robot 100 according to this embodiment includes the base 110, which is the first member, the first arm 120, which is the second member that turns with respect to the base 110, the gear device 1 that transmits driving force for turning the first arm 120 with respect to the base 110, and the motor 171, which is the driving source that outputs driving force to the gear device 1.

With such a configuration, since the extension of life is achieved in the gear device 1, it is possible to realize the robot 100 that does not require time for maintenance and has satisfactory handleability.

2.2. Second Embodiment

A bearing according to a second embodiment is explained.

Figure 10:
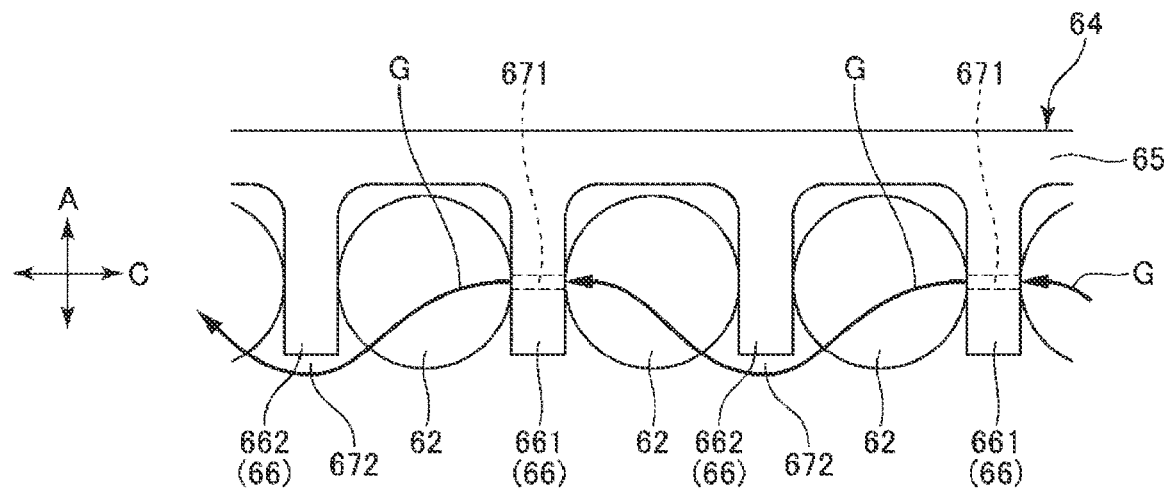
FIG. 10 is a view showing a holder and rolling bodies of a bearing according to a second embodiment when viewed from an outer ring side.

FIG. 10 is a view of a holder and rolling bodies of the bearing according to the second embodiment when viewed from an outer ring side.

The second embodiment is explained below. In the following explanation, differences from the first embodiment are mainly explained. Explanation about similarities to the first embodiment is omitted. In FIG. 10, the same components as the components in the first embodiment are denoted by the same reference numerals and signs.

The holder 64 shown in FIG. 10 is the same as the holder 64 shown in FIG. 7 except that the configuration of the second channel 672 is different.

The second channel 672 shown in FIG. 10 is not the hole or the recess explained above and is a space facing an end face of the second wall section 662 on the opposite side of the base 65. In such a holder 64 shown in FIG. 10, as in the holder 64 in the first embodiment, the position of the first channel 671 in the first wall section 661 and the position of the second channel 672 in the second wall section 662 are different.

With such a configuration, as in the configuration in the first embodiment, it is possible to prevent a flow of the lubricant G from deviating. Consequently, it is possible to improve lubricity of the balls 62 and achieve extension of the life of the bearing 6.

As shown in FIG. 10, the ball 62 (the rolling body) is in contact with the hole, which is the first channel 671. Although not shown in FIG. 10, when the first channel 671 is the recess, the ball 62 comes into contact with the recess. Specifically, since a probability that a portion of the first wall section 661 crossing the center circuit 620 comes into contact with the ball 62 is high, a probability that the opening of the hole, which is the first channel 671, comes into contact with the ball 62 is also high. In this case, an air pressure near the opening changes according to the rolling of the ball 62 and the lubricant G more easily flows according to the change in the air pressure. As a result, it is possible to further improve the lubricity of the balls 62 and achieve further extension of the life of the bearing 6.

In the second embodiment explained above, the same effects as the effects in the first embodiment are obtained.

2.3. Third Embodiment

A bearing according to a third embodiment is explained.

Figure 11:
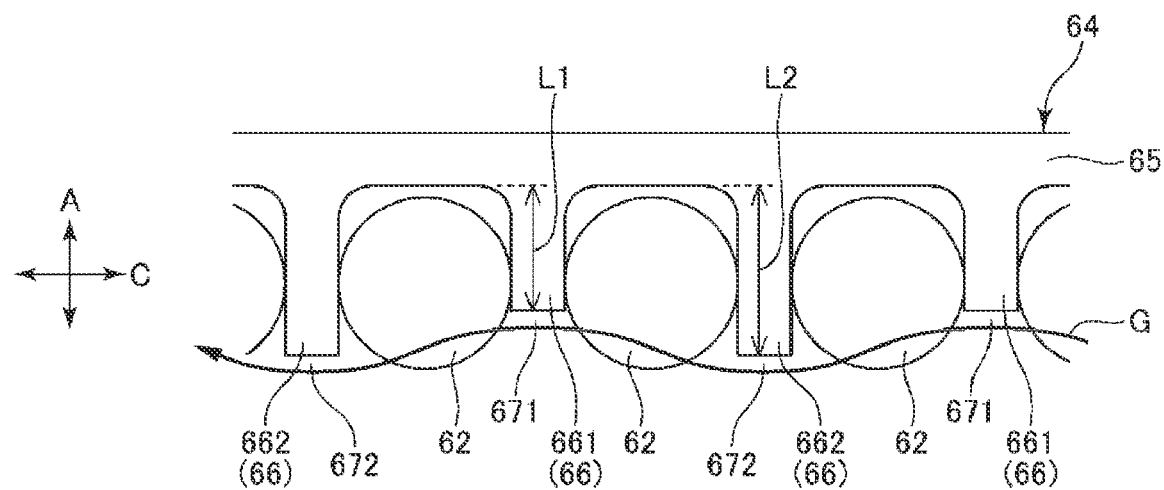
FIG. 11 is a view of a holder and rolling bodies of a bearing according to a third embodiment when viewed from an outer ring side.

FIG. 11 is a view of a holder and rolling bodies of the bearing according to the third embodiment when viewed from an outer ring side.

The third embodiment is explained below. In the following explanation, differences from the second embodiment are mainly explained. Explanation about similarities to the second embodiment is omitted. In FIG. 11, the same components as the components in the second embodiment are denoted by the same reference numerals and signs.

The holder 64 shown in FIG. 11 is the same as the holder 64 shown in FIG. 10 except that the configuration of the first channel 671 is different.

The first channel 671 shown in FIG. 11 is not the hole or the recess explained above and includes a space of the first wall section 661 on the opposite side of the base 65. As in the second channel 672 shown in FIG. 10, the second channel 672 shown in FIG. 11 includes a space of the second wall section 662 on the opposite side of the base 65. A projection length L1 of the first wall section 661 from the base 65 and a projection length L2 of the second wall section 662 from the base 65 are different.

In such a holder 64 shown in FIG. 11, as in the holder 64 in the second embodiment, the position of the first channel 671 in the first wall section 661 and the position of the second channel 672 in the second wall section 662 are different. Consequently, it is possible to prevent a flow of the lubricant G from deviating. Therefore, it is possible to improve lubricity of the balls 62 and achieve extension of the life of the bearing 6.

In such a third embodiment, the same effects as the effects in the second embodiment are obtained.

2.4. Fourth Embodiment

A bearing according to a fourth embodiment is explained.

Figure 12:
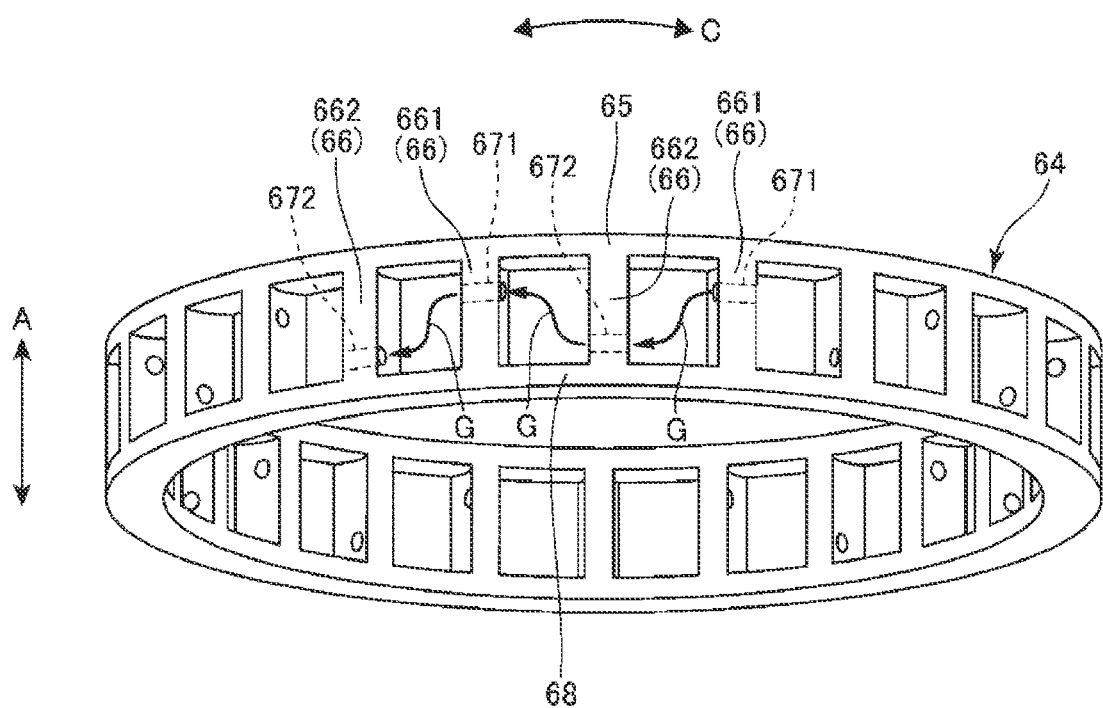
FIG. 12 is a perspective view showing a holder of a bearing according to a fourth embodiment.

FIG. 12 is a perspective view showing a holder of the bearing according to the fourth embodiment.

The fourth embodiment is explained below. In the following explanation, differences from the first embodiment are mainly explained. Explanation about similarities to the first embodiment is omitted. In FIG. 12, the same components as the components in the first embodiment are denoted by the same reference numerals and signs.

The holder 64 shown in FIG. 12 includes a pair of bases 65 and 68 and a plurality of wall sections 66 coupling the base 65 and the base 68. Like the base 65, the base 68 is formed in an annular shape around the axis "a". The plurality of wall sections 66 are disposed in parallel to one another and disposed at equal intervals in the circumferential direction between the base 65 and the base 68. Although not shown in FIG. 12, one ball 62 is located between the wall sections 66 adjacent to each other.

In such a holder 64 shown in FIG. 12, as in the holder 64 in the first embodiment, the position of the first channel 671 in the first wall section 661 and the position of the second channel 672 in the second wall section 662 are different. In such a fourth embodiment, the same effects as the effects in the first embodiment are obtained.

In the holder 64 shown in FIG. 12, the wall sections 66 can be supported by the bases 65 and 68 at both ends in the longitudinal direction of the wall sections 66. Consequently, it is possible to increase mechanical strength of the holder 64. The holder 64 is much less easily damaged. As a result, it is possible to extend the life of the bearing 6.

2.5. Fifth Embodiment

A bearing according to a fifth embodiment is explained.

Figure 13:
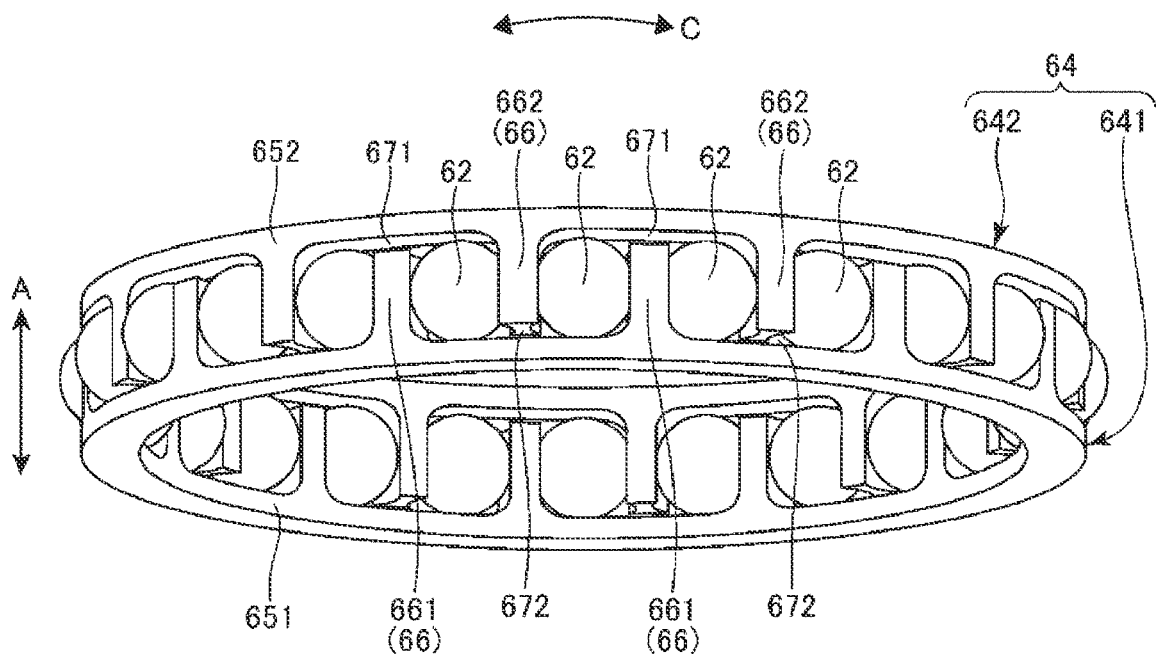
FIG. 13 is a perspective view showing only a holder and rolling bodies in a bearing according to a fifth embodiment.
Figure 14:
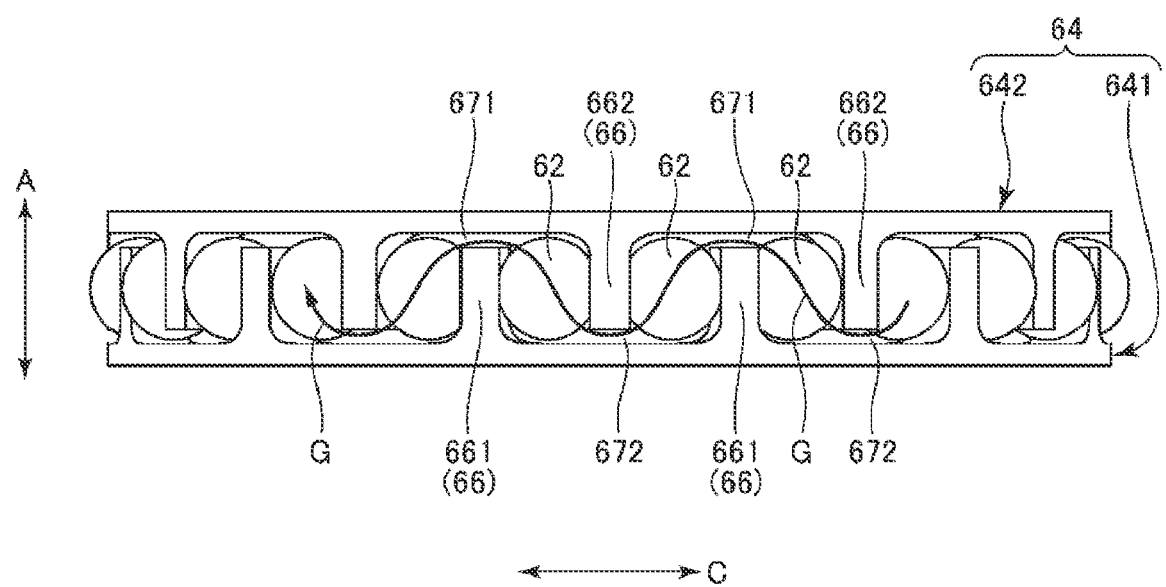
FIG. 14 is a view of the holder and the rolling bodies shown in FIG. 13 when viewed from an outer ring side.
Figure 15:
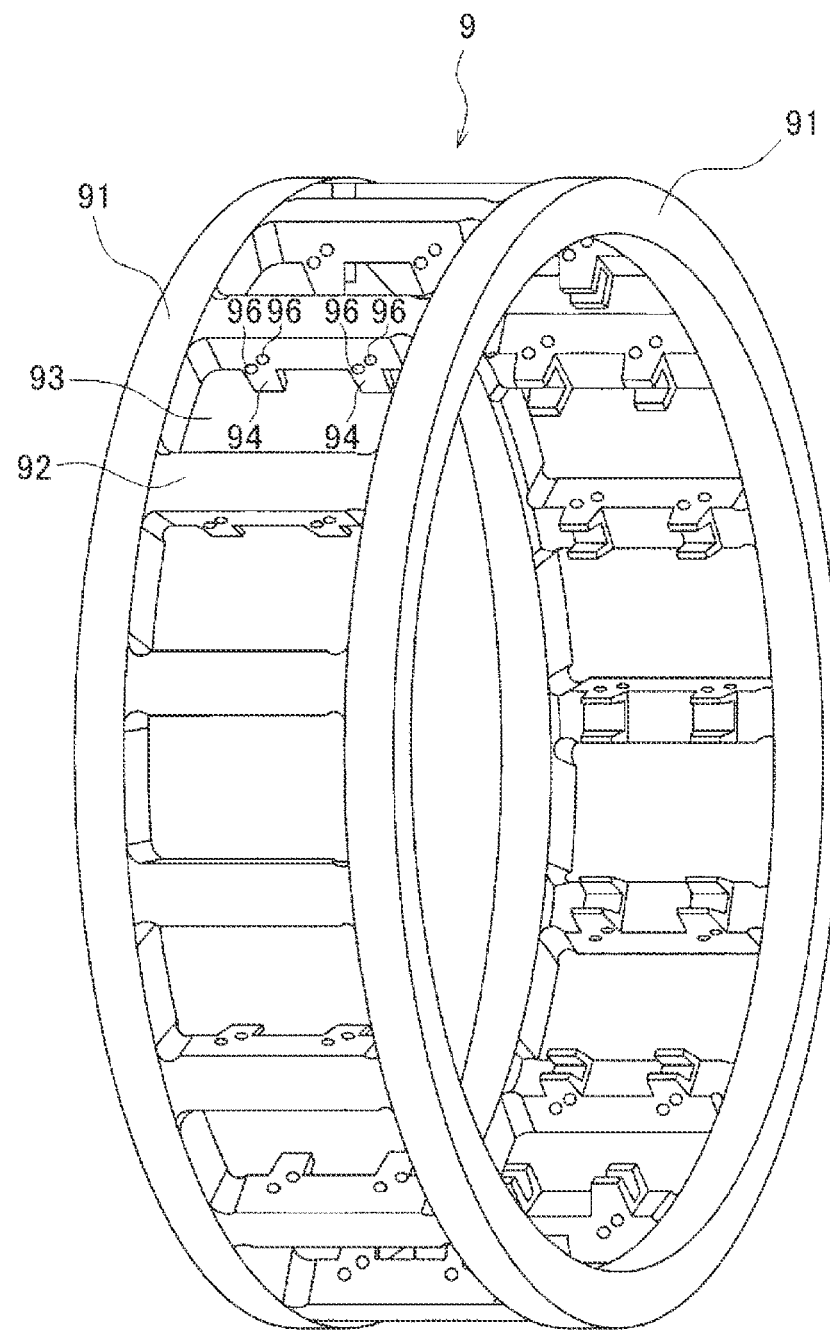
FIG. 15 is a perspective view showing a holder according to related art.

FIG. 13 is a perspective view showing only a holder and rolling bodies in the bearing according to the fifth embodiment. FIG. 14 is a view of the holder and the rolling bodies shown in FIG. 13 when viewed from an outer ring side.

The fifth embodiment is explained below. In the following explanation, differences from the first embodiment are mainly explained. Explanation about similarities to the first embodiment is omitted. In FIGS. 13 and 14, the same components as the components in the first embodiment are denoted by the same reference numerals and signs.

The holder 64 shown in FIG. 13 is configured by two members, that is, a first component 641 and a second component 642. The first component 641 includes a base 651 formed in an annular shape around the axis "a" and a plurality of first wall sections 661 projecting from the base 651. The second component 642 includes a base 652 formed in an annular shape around the axis "a" and a plurality of second wall sections 662 projecting from the base 652. The bases 651 and 652 respectively have the same configuration as the configuration of the base 65 explained above. The plurality of first wall sections 661 are disposed at a predetermined interval along the circumferential direction of the base 651. The plurality of second wall sections 662 are disposed at a predetermined interval along the circumferential direction of the base 652.

In the holder 64 shown in FIG. 13, the first component 641 and the second component 642 are assembled such that one ball 62 is held between the first wall section 661 and the second wall section 662. Depending on the number of balls 62, the ball 62 may be held between the first wall sections 661 or between the second wall sections 662.

When the holder 64 is assembled, a gap is formed between the first wall section 661 of the first component 641 and the base 652 of the second component 642. The gap functions as the first channel 671. Similarly, a gap is also formed between the second wall section 662 of the second component 642 and the base 651 of the first component 641. The gap functions as the second channel 672.

In FIGS. 13 and 14, in at least a part of the holder 64, preferably, the entire holder 64, the first wall section 661 and the second wall section 662 are alternately disposed along the circumferential direction C. Consequently, the first channel 671 and the second channel 672 are respectively opened in one housing space. The positions of the first channel 671 and the second channel 672 are different from each other in the axial direction A.

That is, the holder 64 shown in FIGS. 13 and 14 includes the first component 641 and the second component 642 independent from each other. The holder 64 holds the balls 62 (the rolling bodies) between the first component 641 and the second component 642. Specifically, in at least a part of the holder 64, the balls 62 are held between the first wall section 661 and the second wall section 662.

With such a configuration, it is possible to form a satisfactory flow of the lubricant G while preventing deviation of the balls 62 in the housing spaces in which the balls 62 are housed. Although the holder 64 has a complicated structure in which the position of the first channel 671 and the position of the second channel 672 are differentiated from each other in the axial direction A, the complicated structure is realized by using the first component 641 and the second component 642 respectively having simple structures. Accordingly, the first component 641 and the second component 642 can be relatively easily manufactured by, for example, a molding method using a molding die. As a result, manufacturing cost for the holder 64 can be reduced. Specifically, since the first component 641 and the second component 642 respectively have shapes that can be easily die-cut, posttreatment is unnecessary. It is easy to achieve a reduction in manufacturing cost.

When the gear device 1 is operating, the first component 641, the second component 642, and the balls 62 can move independently from one another. Accordingly, the lubricant G disposed in gaps among the first component 641, the second component 642, and the balls 62 more smoothly flows according to the movements of the sections. As a result, it is possible to more sufficiently supply the lubricant G to between the balls 62 and the inner ring 61 and between the balls 62 and the outer ring 63. As a result, it is possible to particularly improve lubricity of the balls 62. It is possible to achieve further extension of the life of the bearing 6.

In the fifth embodiment explained above, the same effects as the effects in the first embodiment are obtained.

The bearing, the gear device, and the robot according to the present disclosure are explained above based on the embodiments shown in the figures. However, the present disclosure is not limited to this. The components of the sections in the embodiments can be replaced with any components having the same functions. Any other components may be added to the embodiments.

In the gear device explained in the embodiment above, the base included in the robot is the "first member", the first arm is the "second member", and driving force is transmitted from the first member to the second member. However, the present disclosure is not limited to this. The present disclosure is also applicable to a gear device in which an n-th arm is the "first member", a (n+1)-th arm is the "second member", and driving force is transmitted from one to the other of the n-th arm and the (n+1)-th arm. Here, n is an integer equal to or larger than 1. The present disclosure is also applicable to a gear device in which driving force is transmitted from the second member to the first member.

In the embodiments explained above, a horizontal articulated robot is explained. However, the robot according to the present disclosure is not limited to this. For example, the number of joints of the robot is optional. The present disclosure is also applicable to a vertical articulated robot.

Further, in the embodiments explained above, an example is explained in which the gear device is incorporated in the robot. However, the gear device according to the present disclosure can also be used by being incorporated in various apparatuses having a configuration for transmitting driving force from one side to the other side of a first member and a second member that mutually turn.

In the embodiments explained above, an example is explained in which the bearing is incorporated in the gear device. However, the bearing according to the present disclosure is used by being incorporated in various apparatuses as a bearing provided between a rotating shaft and a supporting section that supports the shaft.

What is claimed is:

1. A bearing comprising:
   an outer ring having a center axis;
   an inner ring provided on an inner side in a radial direction of the outer ring, the inner ring being arranged around the center axis;
   a holder provided between the outer ring and the inner ring, the holder being configured with:
   an annular base, the annular base being arranged around the center axis, the annular base having a first surface and a second surface opposite to each other along an axial direction of the center axis;
   a plurality of first walls extending from the first surface of the annular base along the axial direction, each of the plurality of first walls having a first channel in a circumferential direction of the annular base, a base end of each of the plurality of first walls being fixed to only the first surface of the annular base, a top end of each of the plurality of first walls being free of connection with another structure; and
   a plurality of second walls extending from the first surface of the annular base along the axial direction, each of the plurality of second walls having a second channel in the circumferential direction of the annular base, the plurality of first walls and the plurality of second walls being alternately arranged along the circumferential direction of the annular base, a base end of each of the plurality of second walls being fixed to only the first surface of the annular base, a top end of each of the plurality of second walls being free of connection with another structure; and
   a plurality of rolling bodies provided between the outer ring and the inner ring, two adjacent rolling bodies of the plurality of rolling bodies sandwiching one of the plurality of first walls or one of the plurality of second walls with having no other wall therebetween,
   wherein a position of the first channel and a position of the second channel are different from each other along the axial direction, and
   at least one of the first channel and the second channel is a through hole.

2. The bearing according to claim 1, wherein the position of the first channel and the position of the second channel are different from each other in a radial direction of the annular base.

3. The bearing according to claim 1, wherein the first channel and the second channel are the through holes.

4. The bearing according to claim 3, wherein one of the plurality of rolling bodies comes into contact with the through hole of the first channel.

5. The bearing according to claim 3, wherein one of the plurality of rolling bodies does not come into contact with the through hole of the first channel and the through hole of the second channel.

6. A gear device comprising:
an internal gear;
an external gear having flexibility configured to partially mesh with the internal gear and relatively rotate around a rotation axis with respect to the internal gear; and
a wave generator provided on an inner side of the external gear, including a bearing, and configured to move a meshing position of the internal gear and the external gear in a circumferential direction around the rotation axis, wherein
the bearing includes:
an outer ring having a center axis;
an inner ring provided on an inner side in a radial direction of the outer ring, the inner ring being arranged around the center axis;
a holder provided between the outer ring and the inner ring, the holder being configured with:
an annular base, the annular base being arranged around the center axis, the annular base having a first surface and a second surface opposite to each other along an axial direction of the center axis;
a plurality of first walls extending from the first surface of the annular base along the axial direction, each of the plurality of first walls having a first channel in a circumferential direction of the annular base, a base end of each of the plurality of first walls being fixed to only the first surface of the annular base, a top end of each of the plurality of first walls being free of connection with another structure; and
a plurality of second walls extending from the first surface of the annular base along the axial direction, each of the plurality of second walls having a second channel in the circumferential direction of the annular base, the plurality of first walls and the plurality of second walls being alternately arranged along the circumferential direction of the annular base, a base end of each of the plurality of second walls being fixed to only the first surface of the annular base, a top end of each of the plurality of second walls being free of connection with another structure; and
a plurality of rolling bodies provided between the outer ring and the inner ring, two adjacent rolling bodies of the plurality of rolling bodies sandwiching one of the plurality of first walls or one of the plurality of second walls with having no other wall therebetween,
wherein a position of the first channel and a position of the second channel are different from each other along the axial direction, and
at least one of the first channel and the second channel is a through hole.

7. The gear device according to claim 6, wherein the position of the first channel and position of the second channel are different from each other in a radial direction of the annular base.

8. The gear device according to claim 6, wherein the first channel and the second channel are through holes.

9. The gear device according to claim 8, wherein one of the plurality of rolling bodies comes into contact with the through hole of the first channel.

10. The gear device according to claim 8, wherein one of the plurality of rolling bodies does not come into contact with the through hole of the first channel and the through hole of the second channel.

11. A robot comprising:
a first member;
a second member configured to turn with respect to the first member;
a gear device configured to transmit driving force for relatively turning the second member with respect to the first member; and
a driving source configured to output the driving force toward the gear device,
wherein the gear device includes:
an internal gear;
an external gear having flexibility configured to partially mesh with the internal gear and relatively rotate around a rotation axis with respect to the internal gear; and
a wave generator provided on an inner side of the external gear, including a bearing, and configured to move a meshing position of the internal gear and the external gear in a circumferential direction around the rotation axis, wherein
the bearing includes:
an outer ring having a center axis;
an inner ring provided on an inner side in a radial direction of the outer ring, the inner ring being arranged around the center axis;
a holder provided between the outer ring and the inner ring, the holder being configured with:
an annular base, the annular base being arranged around the center axis, the annular base having a first surface and a second surface opposite to each other along an axial direction of the center axis;
a plurality of first walls extending from the first surface of the annular base along the axial direction, each of the plurality of first walls having a first channel in a circumferential direction of the annular base, a base end of each of the plurality of first walls being fixed to only the first surface of the annular base, a top end of each of the plurality of first walls being free of connection with another structure; and
a plurality of second walls extending from the first surface of the annular base along the axial direction, each of the plurality of second walls having a second channel in the circumferential direction of the annular base, the plurality of first walls and the plurality of second walls being alternately arranged along the circumferential direction of the annular base, a base end of each of the plurality of second walls being fixed to only the first surface of the annular base, a top end of each of the plurality of second walls being free of connection with another structure; and
a plurality of rolling bodies provided between the outer ring and the inner ring, two adjacent rolling bodies of the plurality of rolling bodies sandwiching one of the plurality of first walls or one of the plurality of second walls with having no other wall therebetween,
wherein a position of the first channel and a position of the second channel are different from each other along the axial direction, and at least one of the first channel and the second channel is a through hole.

* * * * *